(12) United States Patent
Ma (10) Patent No.: US 12,158,851 B2
(45) Date of Patent: Dec. 3, 2024

(54) READ/WRITE CONTROL METHOD AND DEVICE FOR DDR DYNAMIC RANDOM ACCESS MEMORY, AND SYSTEM

(71) Applicant: BOE Technology Group Co., Ltd., Beijing (CN)

(72) Inventor: Xitong Ma, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 43 days.

(21) Appl. No.: 18/136,183

(22) Filed: Apr. 18, 2023

(65) Prior Publication Data

US 2023/0251982 A1    Aug. 10, 2023

Related U.S. Application Data

(63) Continuation-in-part of application No. 17/407,092, filed on Aug. 19, 2021, now Pat. No. 11,676,653.

(30) Foreign Application Priority Data

Sep. 23, 2020  (CN) .......................... 202011008745.4

(51) Int. Cl.
*G06F 13/16* (2006.01)
*G06F 13/24* (2006.01)

(52) U.S. Cl.
CPC .......... *G06F 13/1689* (2013.01); *G06F 13/24* (2013.01)

(58) Field of Classification Search
CPC .............................. G06F 13/1689; G06F 13/24
See application file for complete search history.

(56) References Cited

U.S. PATENT DOCUMENTS

| | | | |
|---|---|---|---|
| 2007/0024706 A1* | 2/2007 | Brannon, Jr. | ...... H04N 21/6587 348/E7.071 |
| 2008/0266305 A1 | 10/2008 | Cheng et al. | |
| 2012/0082399 A1 | 4/2012 | Yanada | |
| 2012/0249875 A1 | 10/2012 | Cheng et al. | |
| 2013/0198432 A1 | 8/2013 | Ning et al. | |
| 2014/0184485 A1 | 7/2014 | Kim | |
| 2016/0261807 A1* | 9/2016 | Seshadrinathan | ...... H04N 23/80 |
| 2017/0006230 A1* | 1/2017 | Jeong | ........................ G09G 5/12 |
| 2019/0164518 A1 | 5/2019 | Dimitrov | |
| 2020/0312278 A1 | 10/2020 | Wu et al. | |

OTHER PUBLICATIONS

U.S. Appl. No. 17/407,092 Non-Final Office Action dated Dec. 22, 2022.
U.S. Appl. No. 17/407,092 Notice of Allowance dated Apr. 4, 2023.

\* cited by examiner

Primary Examiner — Eric T Oberly
(74) Attorney, Agent, or Firm — IPro, PLLC (57) ABSTRACT

The disclosure provides a read/write control method and device for a DDR (Double Data Rate) dynamic random access memory, and a system. The device includes a read control signal generating unit and a read memory controller, and the read control signal generating unit is in signal connection with the read memory controller; the read control signal generating unit is configured for determining a minimum frame period from a plurality of received signal sources, generating a read control signal based on a delay time, and providing the read control signal to the read memory controller; and the read memory controller is configured for controlling the reading of video frames from the DDR dynamic random access memory according to the read control signal.

20 Claims, 7 Drawing Sheets

READ/WRITE CONTROL METHOD AND DEVICE FOR DDR DYNAMIC RANDOM ACCESS MEMORY, AND SYSTEM

CROSS-REFERENCE TO RELATED APPLICATION

The application is a Continuation-In-Part of U.S. application Ser. No. 17/407,092, claims the priority to the U.S. application Ser. No. 17/407,092, which claims the priority of a Chinese patent application filed in the China National Intellectual Property Administration on Sep. 23, 2020 with application Ser. No. 20/2011008745.4 and application name "Read/Write Control Method and Device for DDR Dynamic Random Access Memory, and System", the entire contents of which are hereby incorporated by reference.

TECHNICAL FIELD

The disclosure relates to the technical field of random access memories, in particular to a read/write control method and device for a DDR (Double Data Rate) dynamic random access memory, and a system.

BACKGROUND

With the development of video surveillance, it may be necessary to at the same time monitor a plurality of targets in one occasion, that is, a plurality of input signals from different sources with the same frame rate. When processing the plurality of input signals from different sources with the same frame rate, the frame frequency of a first signal source on an input side can be used to match the frame frequencies of other signal sources, that is, other signal sources follow the frame frequency of the first signal.

SUMMARY

The disclosure provides a read/write control method and device for a DDR dynamic random access memory, and a system.

In a first aspect, an embodiment of the disclosure provides a read/write control device for a DDR dynamic random access memory, wherein the DDR dynamic random access memory is used for saving video frames of a plurality of received signal sources, the device includes: a timing sequence detector, a read control signal generating unit and a read memory controller, the timing sequence detector is in signal connection with the read control signal generating unit, and the read control signal generating unit is in signal connection with the read memory controller;

the timing sequence detector is configured for: determining a plurality of frame periods respectively corresponding to the plurality of received signal sources based on respective time intervals between respective two adjacent vertical synchronization signals of the plurality of received signal sources; and determining vertical synchronization signals corresponding to each other of the plurality of received signal sources, and determining a plurality of frame period differences based on the vertical synchronization signals corresponding to each other of the plurality of received signal sources;

the read control signal generating unit is configured for: reading the plurality of frame periods and the plurality of frame period differences determined by the timing sequence detector; determining a minimum frame period from the plurality of frame periods; from the plurality of frame period differences, determining frame period differences of remaining signal sources with respect to a signal source having the minimum frame period; respectively summing the frame period differences of the respective remaining signal sources with the corresponding frame periods, to obtain a maximum value as a delay time; and delaying respective rising edges of the signal source having the minimum frame period, by the delay time, to generate a read control signal, and providing the read control signal to the read memory controller; and the read memory controller is configured for: controlling reading of the video frames from the DDR dynamic random access memory according to the read control signal.

In a second aspect, an embodiment of the disclosure provides a read/write control method for the above DDR dynamic random access memory, the method is applied to the read/write control device for the DDR dynamic random access memory, and the method includes:

determining the plurality of frame periods respectively corresponding to the plurality of received signal sources based on the respective time intervals between the respective two adjacent vertical synchronization signals of the plurality of received signal sources; and determining the vertical synchronization signals corresponding to each other of the plurality of received signal sources, and determining the plurality of frame period differences based on the vertical synchronization signals corresponding to each other of the plurality of received signal sources;

determining the minimum frame period from the plurality of frame periods; from the plurality of frame period differences, determining the frame period differences of the remaining signal sources with respect to the signal source having the minimum frame period; respectively summing the frame period differences of the respective remaining signal sources with the corresponding frame periods, to obtain the maximum value as the delay time; and delaying the respective rising edges of the signal source having the minimum frame period, by the delay time, to generate the read control signal; and controlling the reading of the video frames from the DDR dynamic random access memory according to the read control signal.

In a third aspect, an embodiment of the disclosure provides a monitor system, and the system includes the read/write control device for the DDR dynamic random access memory as described in the first aspect.

The above description is only an overview of the technical solution of this disclosure, which can be implemented according to the contents of the specification in order to understand the technical means of this disclosure more clearly, and in order to make the above and other objects, features and advantages of this disclosure more obvious and understandable, the detailed description of this disclosure will be given below.

BRIEF DESCRIPTION OF THE DRAWINGS

Other features, objects and advantages of the disclosure will become more apparent by reading the detailed description of non-limiting embodiments made with reference to the following drawings.

DETAILED DESCRIPTION

The disclosure will be further described in detail with reference to the drawings and embodiments. It can be understood that the specific embodiments described here are only used to explain the relevant disclosure, but not to limit the disclosure. It should also be noted that for convenience of description, only the parts related to disclosure are shown in the drawings.

It should be noted that the embodiments in the disclosure and the features in the embodiments can be combined without conflict. Hereinafter, the disclosure will be described in detail with reference to the drawings and in combination with embodiments.

Figure 1:
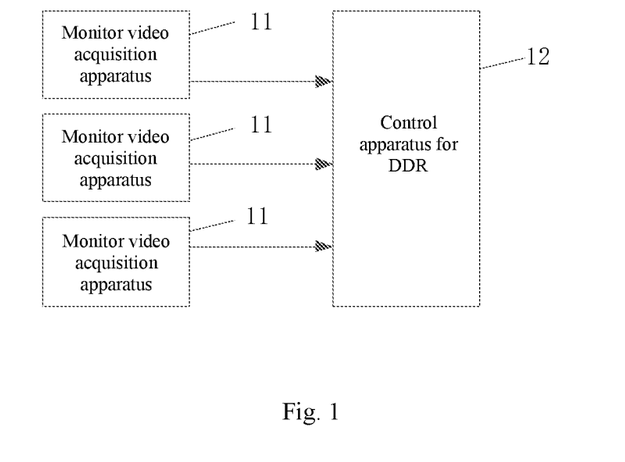
FIG. 1 shows a structural diagram of a monitor system provided by an embodiment of the disclosure.

Please refer to FIG. 1, FIG. 1 shows a structural diagram of a monitor system provided by an embodiment of the disclosure. As shown in FIG. 1, the monitor system includes a plurality of monitor video acquisition apparatuses 11 and a DDR dynamic random access memory control apparatus 12.

The monitor video acquisition apparatuses 11 are configured for acquiring monitor video data and transmitting the acquired monitor video data to the DDR dynamic random access memory control apparatus 12 through a corresponding data transmission channel.

Each monitor video acquisition apparatus can be regarded as a signal source, for example, it can be represented by SDI-number. For example, SDI-1 represents a first signal source and SDI-2 represents a second signal source.

The DDR dynamic random access memory control apparatus 12 is configured for performing real-time superimposing on the received monitor video data to obtain an output display image.

In the related art, when a plurality of video data (monitor video data corresponding to a plurality of signal sources) are written into the DDR dynamic random access memory (DDR for short), the writing is usually controlled based on a first signal in the frequency of a plurality of received videos, and other signals follow the first signal. However, the monitor video frame data are read from the DDR according to the frame frequency corresponding to the written monitor video frame data. For example, the frame rate of the first signal at t1 is 59.9 Hz, and if the frame frequency of the first signal is followed, the frame frequency of other signals is also 59.9 Hz. If the frame frequency of the first signal at t2 becomes 60.0 Hz due to temperature or time jitter, in theory, the frame frequency of other signals which follow the frame rate of the first signal will also be adjusted to 60.0 Hz. However, in the transmission process of other signals, clock jitter or temperature might cause a change in the frame rate. For example, when following the frame frequency of the first signal 59.9 Hz at t1, the second signal actually has a frame frequency of 60.0 Hz, but the DDR control apparatus still conducts control according to the frame frequency of the first signal, and as a result, there will be a difference of one frame between the second signal and the first signal at t1+10 s, that is, the second signal will lose one frame. The above loss is intolerable for the monitor system.

In order to solve the above problem, the disclosure provides a technical solution for read/write control of a DDR, which can effectively solve the problem of frame loss when reading videos from the DDR.

Figure 2:
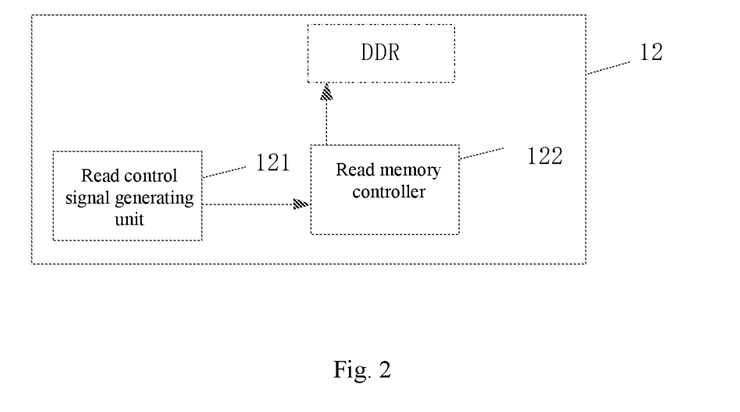
FIG. 2 shows a structural diagram of a read/write control device for a DDR dynamic random access memory provided by an embodiment of the disclosure.

The working principle of read-write control of the DDR proposed in this disclosure will be described with reference to FIG. 2. Please refer to FIG. 2, which shows a structural diagram of a read/write control device for a DDR provided by an embodiment of the disclosure. As shown in FIG. 2, the device includes a read control signal generating unit 121 and a read memory controller 122, and the read control signal generating unit 121 is in signal connection with the read memory controller 122;

the read control signal generating unit 121 is configured for determining a minimum 20) frame period from a plurality of received signal sources, and further configured for generating a read control signal based on the minimum frame period and providing the read control signal to the read memory controller 122; and the read memory controller 122 is configured for controlling the reading of video frames from the DDR dynamic random access memory according to the read control signal.

According to the embodiment of the disclosure, by determining the minimum frame period corresponding to the plurality of signal sources, then generating the read control signal based on the minimum frame period, and using the generated read control signal to control the reading of the video frames from the DDR, the problem of frame loss caused by fixedly following the first signal source can be effectively solved.

Figure 3:
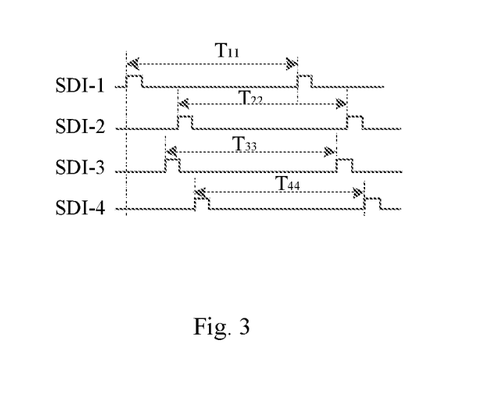
FIG. 3 shows a schematic diagram of a frame period provided by an embodiment of the disclosure.

The minimum frame period refers to a minimum value of frame period determined from the plurality of signal sources. The frame period refers to a time interval between two adjacent vertical synchronization signals in each signal source. The vertical synchronization signal, which can also be called vertical synchronization (Vsync), refers to a pulse signal between two frames, which is used to indicate the end of a previous frame and the start of a new frame. Vsync may be a pulse lasting pretty long, which may last for one or several lines of scanning time, but no pixel signal appears during this period. As shown in FIG. 3, a waveform graph of acquired pulse signals corresponding to each signal source is drawn by taking four monitor signals as an example, where T11 represents the frame period of a first signal source SDI-1, T22 represents the frame period of a second signal source SDI-2, T33 represents the frame period of a third signal source SDI-3, T44 represents the frame period of a fourth signal source SDI-4. One of T11, T22, T33 and T44 is determined as the minimum frame period.

After determining the minimum frame period among the plurality of frame periods, the read control signal generating unit 121 generates a read control signal based on the minimum frame period, and the read memory controller 122 controls operation based on the read control signal.

Figures 4, 5:
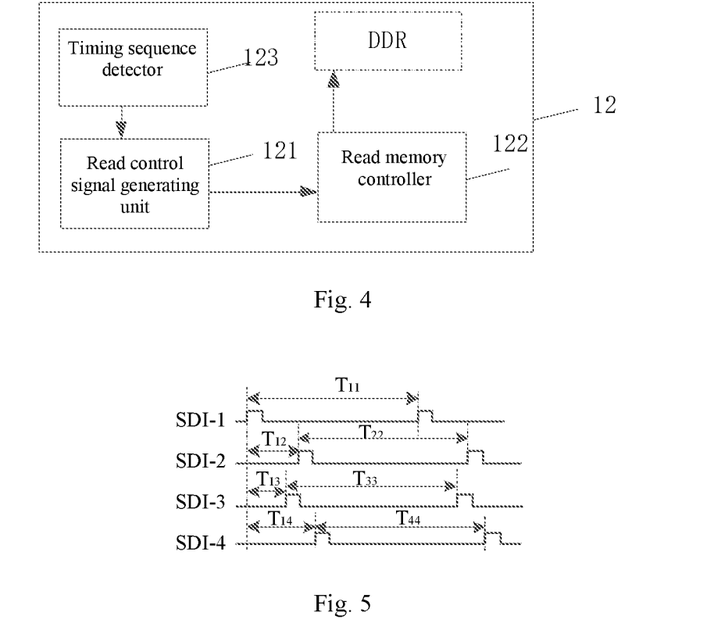
FIG. 4 shows a structural diagram of a read/write device for a DDR dynamic random access memory provided by an embodiment of the disclosure.
FIG. 5 shows a schematic diagram of a frame period difference provided by an embodiment of the disclosure.

Next, with reference to FIG. 4, the principle of determining the minimum frame period and a frame period difference by the read/write device for the DDR will be further described.

As shown in FIG. 4, the device may further include a timing sequence detector 123. The timing sequence detector 123 is in signal connection with the read control signal generating unit 121, and is also in signal connection with a write memory controller.

The timing sequence detector 123 is configured for determining a frame period corresponding to each signal source based on a time interval between two adjacent vertical synchronization signals of each signal source in the plurality of signal sources.

The timing sequence detector 123 is further configured for:
  determining a vertical synchronization signal corresponding to the first signal source in the plurality of signal sources;
  determining vertical synchronization signals corresponding to other signal sources in the plurality of signal sources; and
  determining the frame period difference based on the vertical synchronization signal corresponding to the first signal source and the vertical synchronization signals corresponding to the other signal sources.

The frame period difference refers to the difference between the frame periods corresponding to other signal sources and the frame period corresponding to the first signal source in the plurality of signal sources. The first signal source can be determined according to interface positions corresponding to the plurality of signal sources, for example, an interface address corresponding to SDI-1 is an interface address of SDI_RX1. This interface address can be considered as the first signal source.

According to the embodiment of the disclosure, by adding the statistical analysis function for the frame period in the timing sequence detector, and using a statistical analysis result to generate the read control signal, the multiplexing efficiency of components is effectively improved.

FIG. 5 is a schematic diagram of a frame period difference between other signal sources and the first signal source determined based on the four acquired monitor signals shown in FIG. 3. As shown in FIG. 5, T12 represents a time difference between the frame period of the first signal source SDI-1 and the frame period of the second signal source SDI-2. T13 represents a time difference between the frame period of the first signal source SDI-1 and the frame period of the third signal source SDI-3. T14 represents a time difference between the frame period of the first signal source SDI-1 and the frame period of the fourth signal source SDI-4.

After determining the minimum frame period, the read control signal generating unit 121 is configured for determining the frame period difference corresponding to the minimum frame period, determining a rising edge of each vertical synchronization signal of the signal source corresponding to the minimum frame period, and delaying each rising edge by a sum of the minimum frame period with the frame period difference corresponding to the minimum frame period to obtain a rising edge of the read control signal.

Figure 6:
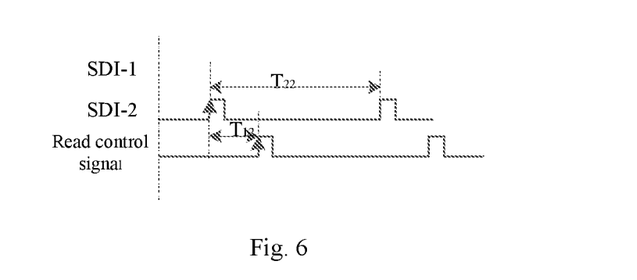
FIG. 6 shows a schematic diagram of a read control signal provided by an embodiment of the disclosure.

The read control signal generating unit 121 may generate the read control signal according to a timing sequence control signal generation diagram shown in FIG. 6. Assuming that the frame period corresponding to the second signal source is the minimum frame period, that is, T22 is the minimum frame period, and the frame period difference corresponding to the minimum frame period is T12, the rising edge of the vertical synchronization pulse of the second signal source is delayed by a time value corresponding to a sum of T22 with T12 to generate the rising edge of the read control signal, which is provided to the read memory controller.

According to the embodiment of the disclosure, the read control signal is generated by dynamically following the frame period changes of different signal sources, and the problem of frame loss caused by fixedly following the first signal source can be effectively avoided.

Figure 7:
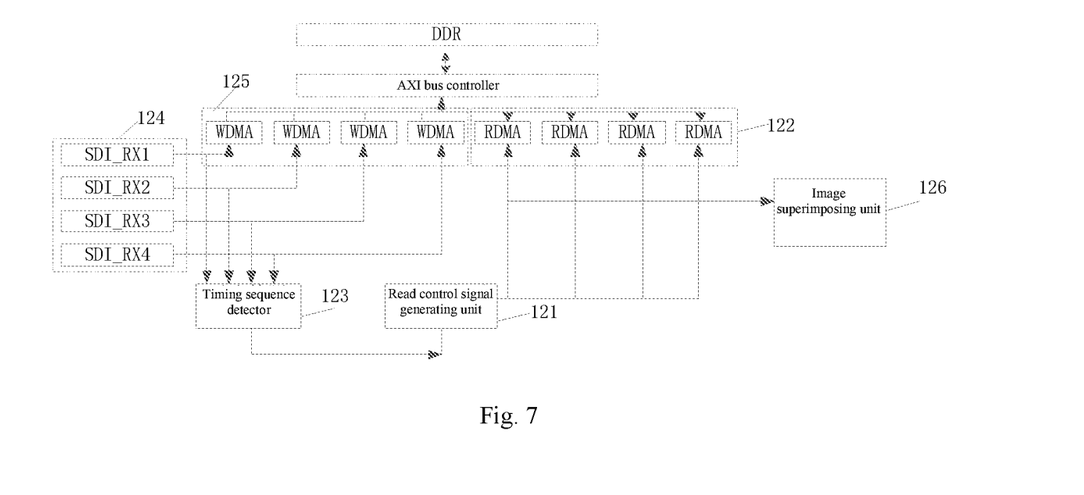
FIG. 7 shows a structural diagram of another read/write control device for a DDR dynamic random access memory provided by an embodiment of the disclosure.

In order to introduce the working principle of this disclosure in detail, the following takes four monitor signal sources as an example. As shown in FIG. 7 which shows a structural diagram of a read/write control device for a DDR, the read/write control device for the DDR includes the read control signal generating unit 121 and the read memory controllers 122 as shown in FIG. 2. The read memory controller 122 can be, for example, a frame address read controller (Read Direct Memory Access, RDMA for short), or simply a read controller. The device may further include a timing sequence detector 123 as shown in FIG. 4. The functions of the above modules are the same as those described above.

Further, as shown in FIG. 7, the device may further include a plurality of receivers 124 corresponding to serial digital interfaces (SDI). The receiver corresponding to the first signal source is SDI_RX1, the receiver corresponding to the second signal source is SDI_RX2, the receiver corresponding to the third signal source is SDI_RX3, and the receiver corresponding to the fourth signal source is SDI_RX4.

The device may further include a plurality of write memory controllers 125 in one-to-one correspondence to the receivers 124. The write memory controller 125 may be, for example, a frame address write controller (Write Direct Memory Access, WDMA for short), or simply a write controller.

During power-on initialization, an initialization address of the write memory controller 125 is assigned with a value of 3, and an initialization address of the read memory controller 122 is assigned with a value of 1.

The receiver SDI_RX1 corresponding to the first signal source receives monitor video data from SDI_1 corresponding to the first signal source. The receiver SDI_RX1 corresponding to the first signal source provides a signal to the write memory controller 125, and the write memory controller 125 is configured for controlling the frame address switching of writing.

An address update by the write memory controller 125 can be written into the DDR along with a corresponding clock. For example, a current write frame address corresponding to an n<th> signal source is $WDMA_n$ (new).

The current corresponding write frame address can be calculated by the following formula:

$$WDMA_n(new) = WDMA_n(old) + 1$$

where $WDMA_n$ (new) represents the current write frame address;

$WDMA_n$(old) represents a previous write frame address; and n represents the number of signal sources.

When reading the monitor video frame data initially, one frame of monitor video frame data can be cached first. Then, in the process of reading the frame address update, the read frame address update is triggered by receiving the read control signal generated by the reading control signal generating unit 121. For example, the read frame address of the previous frame is $RDMA_n$(old), and when the rising edge of the read control signal is detected, the read frame address update is triggered.

The current corresponding read frame address can be calculated by the following formula:

$$RDMA_n(new) = RDMA_n(old) + 1$$

where $RDMA_n$ (new) represents the current read frame address;

$RDMA_n$(old) a previous read frame address; and n represents the number of signal sources.

When a new trigger signal, i.e. a new rising edge, arrives, if $RDMA_n$(old) = $WDMA_n$(old) the $WDMA_n$(old) is repeatedly read, i.e. $RDMA_n$(new) = $RDMA_n$(old).

In the embodiment of the disclosure, by repeatedly reading the previous read frame address, it is further ensured that there is no frame loss in the frame reading process, thereby effectively improving the accuracy of frame data processing.

The read control signal generating unit 121 determines the minimum frame period by comparing the frame periods of the four signal sources, determines the frame period difference corresponding to the minimum frame period based on the minimum frame period, and then receives the rising edge of the read control signal which can be configured for updating the read frame address based on the minimum frame period and the frame period difference corresponding to the minimum frame period, wherein the duration of the read control signal is the same as that of the vertical synchronization signal. The rising edge of the read control signal may be obtained by delaying the rising edge of the vertical synchronization signal by the sum of the minimum frame period with the frame period difference corresponding to the minimum frame period. The rising edge of the read control signal shown in FIG. 6 is obtained by delaying the rising edge corresponding to the second signal source by a sum of the minimum frame period T22 with the frame period difference T12 corresponding to the minimum frame period T22.

On the basis of the above embodiment, the device may further include an image superimposing unit 126, and the image superimposing unit 126 is configured for superimposing the video frames read from the DDR and outputting the superimposed video frames. For example, the image superimposing unit may be a V-by-one transmitting module. V-by-one is a high-definition digital display bus (VOB bus for short), which is configured for communicating with a display device and sending the superimposed video frames to the display device. The display device is, for example, a display.

After the cyclic reading of the frame address update, the image superimposing unit superimposes the read video frames and outputs them to the display, so as to realize the smooth display of a surveillance video.

On the basis of the above embodiment, the device further includes an AXI bus controller, which can also be called DDR user interface arbitration controller, and is configured for performing interrupt processing on an equipment interrupt request. For example, in order to improve the parallel speed, graphics and videos are interrupted separately, the equipment interrupt request can be resolved into a plurality of sub-requests, and based on priority judgment, each sub-request corresponds to an interrupt processing logic, so as to improve the real-time display performance of a monitor system.

The division of several modules or units mentioned in the above detailed description is not mandatory. Actually, according to the embodiments of the disclosure, the features and functions of two or more modules or units described above may be embodied in one module or unit. On the contrary, the features and functions of one module or unit described above can be embodied in a plurality of modules or units.

Figure 8:
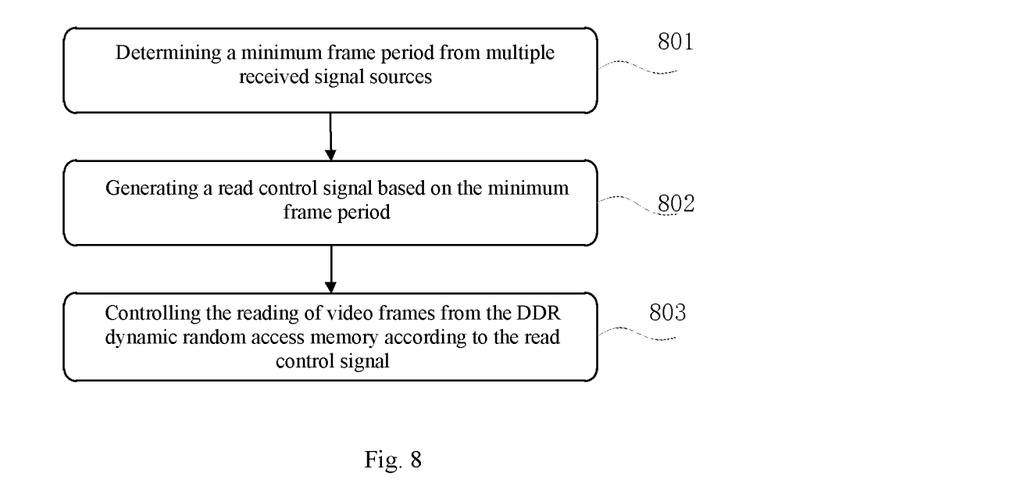
FIG. 8 shows a flowchart of a read/write control method for a DDR dynamic random access memory provided by an embodiment of the disclosure.

On the basis of the above embodiment, an embodiment of the disclosure further provides a read/write control method for a DDR. Please refer to FIG. 8, which shows a flowchart of a read/write control method for the above DDR provided by an embodiment of the disclosure. As shown in FIG. 8, the method is applied to the read/write control device for the DDR, and the method includes:

step 801, determining a minimum frame period from the plurality of received signal sources;

step 802, generating a read control signal based on the minimum frame period; and step 803, controlling the reading of video frames from the DDR according to the read control signal.

In the above steps, the read/write control device for the DDR dynamically follows and controls the reading of the video frames according to the minimum frame period of the plurality of signal sources, which can effectively solve the problem of frame loss caused by fixedly following the first signal source.

Figure 9:
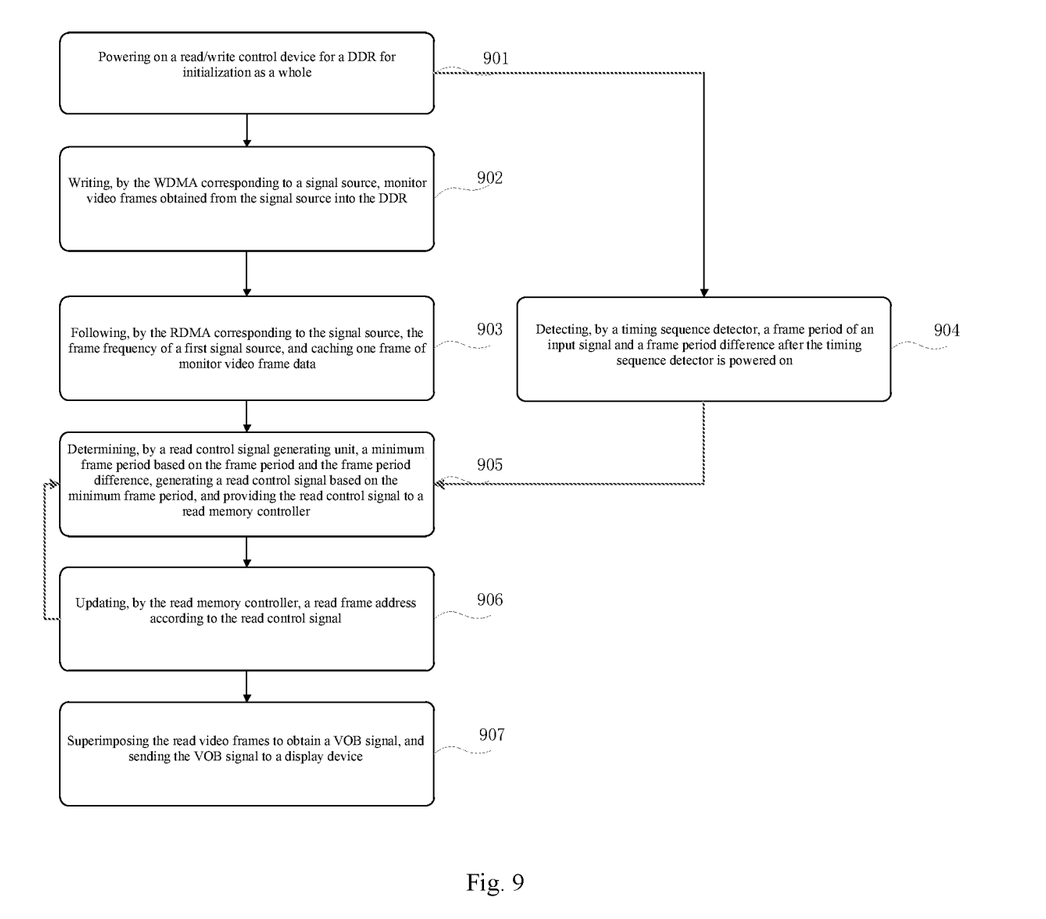
FIG. 9 shows a flowchart of another read/write control method for a DDR dynamic random access memory provided by an embodiment of the disclosure.

On the basis of the above steps of the method, the read/write control for the DDR as described in FIG. 7 is taken as an example, please refer to FIG. 9, which shows a flowchart of a read/write control method for a DDR provided by an embodiment of the disclosure, and as shown in FIG. 9, the method can be executed according to the following steps:

step 901, powering on a read/write control device for a DDR for initialization as a whole;

wherein when a WDMA is powered on, a write frame address of the WDMA is initialized to 3, and when an RDMA is powered on, a read frame address of the RDMA is initialized to 1;

step 902, writing, by the WDMA corresponding to a signal source, monitor video frames obtained from the signal source into the DDR;

step 903, following, by the RDMA corresponding to the signal source, the frame frequency of a first signal source, and caching one frame of the monitor video frame data;

step 904, detecting, by a timing sequence detector, a frame period of an input signal and a frame period difference after the timing sequence detector is powered on;

step 905, determining, by a read control signal generating unit, a minimum frame period based on the frame period and the frame period difference corresponding to the minimum frame period, generating a read control signal based on a sum of the minimum frame period and the frame period difference, and providing the read control signal to a read memory controller;

step 906, updating, by the read memory controller, a read frame address according to the read control signal, and repeating steps 905 and 906 to provide the read video frames to an image superimposing unit; and step 907, superimposing the read video frames to obtain a VOB signal, and sending the VOB signal to a display device.

The above step 905 may include:

determining a minimum value in the plurality of frame periods as the minimum frame period;

calculating the frame frequency based on the minimum frame period; and generating the read control signal based on the minimum frame period, the frame period difference corresponding to the minimum frame period, and the frame frequency.

The above step 905 further includes:

determining a rising edge of each vertical synchronization signal of a signal source corresponding to the minimum frame period; and delaying each rising edge by the sum of the minimum frame period with the frame period difference corresponding to the minimum frame period to obtain a rising edge of the read control signal.

Step 906 may further include:

updating the read frame address when the rising edge of the read control signal arrives; and according to the updated read frame address, reading the video frames from the DDR.

When the rising edge of the read control signal arrives and the read frame address is the same as a write frame address of the DDR, a video frame corresponding to the write frame address is repeatedly read.

In the above steps, the read/write control device for the DDR dynamically follows and controls the reading of the video frames according to the minimum frame period of the plurality of signal sources, which can effectively solve the problem of frame loss caused by fixedly following the first signal source.

By repeatedly reading the video frame when the write frame address is the same as the read frame address, the probability of frame loss is further reduced, and the accuracy of multi-monitor video processing is effectively improved.

Figure 10:
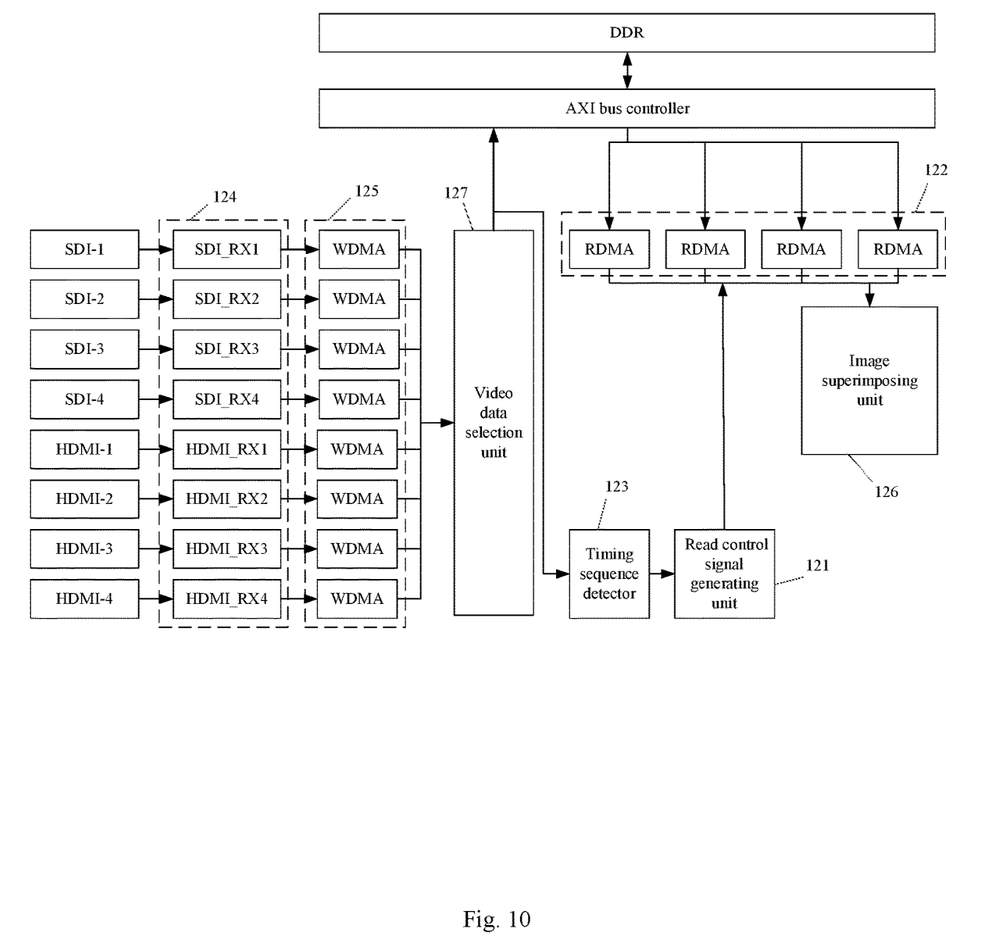
FIG. 10 shows a structural diagram of further another read/write control device for a DDR dynamic random access memory provided by an embodiment of the disclosure.

FIG. 10 shows a structural diagram of further another read/write control device for the DDR dynamic random access memory provided by an embodiment of the disclosure. As shown in FIG. 10, in the read/write control device for the DDR dynamic random access memory provided by the embodiment, SDI_RX1–SDI_RX 4 are receivers corresponding to SDI-1–SDI-4, i.e., are the above receivers 124 for SDI, HDMI_RX1–HDMI_RX14 are receivers corresponding to high definition multimedia interface (HDMI) HDMI-1–HDMI-4, i.e., are the receiver 124 for HDMI, WDMA is the write memory controller 125, the timing sequence detector 123 is the same as the above, the read control signal generating unit 121 is the same as the above, the AXI bus controller is the same as the above, RDMA is the read memory controller 122, and the image superimposing unit 126 is the same as the above.

The read/write control device provided by the embodiment further includes a video data selection unit 127, such as a MUX_8SEL_4 module. The video data selection unit 127 is in signal connection between the write memory controllers 125 and the DDR dynamic random access memory, and configured for selecting a plurality of received signal sources from input signal sources. A plurality of receivers 124 corresponding to digital component serial interfaces and/or a plurality of receivers 124 corresponding to high definition multimedia interfaces are in signal connection with the video data selection unit 127 respectively via the write memory controllers 125, and input ends of the video data selection unit 127 are in one-to-one correspondence to the write memory controllers 125. The plurality of receivers 124 are configured for receiving monitor video data from the corresponding digital component serial interfaces and/or the corresponding high definition multimedia interfaces, and providing the monitor video data to the DDR dynamic random access memory.

The solution of the embodiment is aimed at a monitoring function for a plurality of machine for a monitor. For example, the solution of the embodiment is in a QUAD VIEW display mode, that is, it is required to support four inputs of non-homologous signals, for example, with input interfaces of the above SDI1/SDI2/SDI3/SDI4/HDMI1/HDMI2/HDMI3/HDMI4, which can select 4 out of 8 inputs of non-homologous signals, for display.

Due to that the input signal sources of QUAD VIEW are non-homologous signals, and there is no unified clock system among them, there is no fixed phase relationship among the respective input signal sources, that is, there are differences of frame rate among them, and the differences of frame rate will accumulate over time.

For a monitor system, it is necessary to observe each frame of the signals. For example, the traditional processing mode is that the frame rates of four output signals follows the frame rate of the first input signal source, which can cause frame loss or duplicate frames, which cannot meet the needs of signal processing for the monitor.

The solutions of the embodiments of the disclosure focus on direct relations among the frame rates of the input signal sources, and further distinguishes two situations for processing, to avoid signal frame loss. At the same time, for signals with close frame rates, by eliminating errors among frames, error accumulation of the frame rates is voided.

Figure 11:
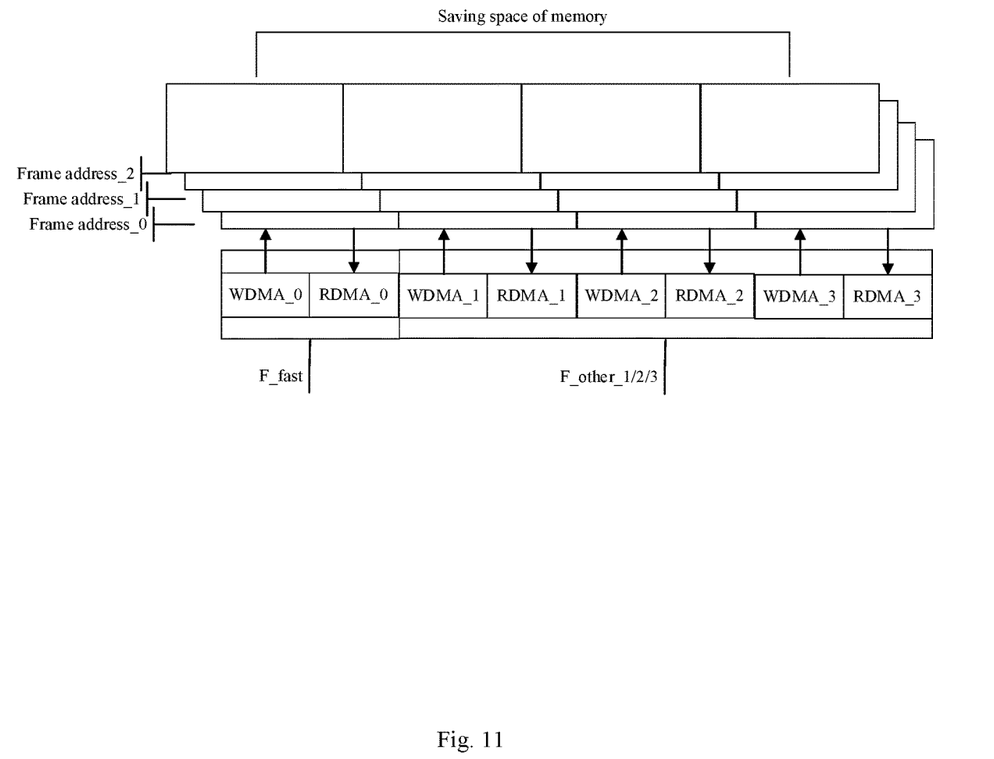
FIG. 11 shows a schematic diagram of an arrangement of a plurality of signals in a saving space of a memory provided by an embodiment of the disclosure.
Figure 12:
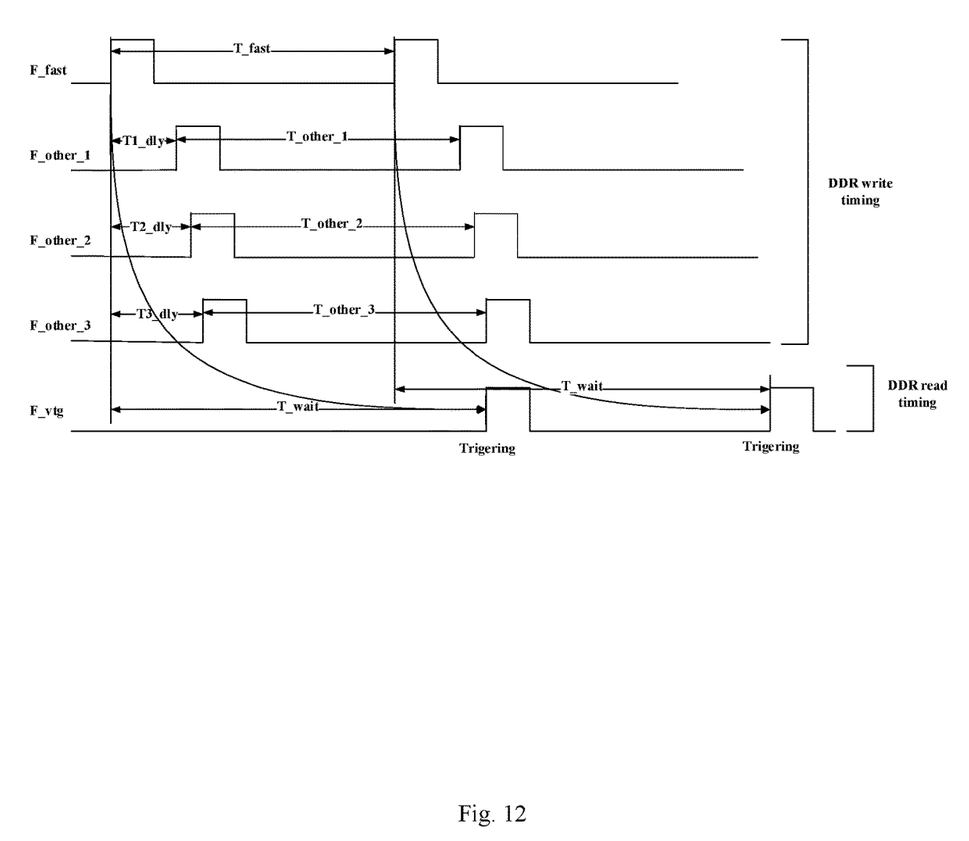
FIG. 12 shows a schematic diagram of trigger logic of write timing and read timing of memory provided by an embodiment of the disclosure.

FIG. 11 shows a schematic diagram of an arrangement of a plurality of signals in a saving space of the memory provided by an embodiment of the disclosure. FIG. 12 shows a schematic diagram of trigger logic of write timing and read timing of the memory provided by an embodiment of the disclosure.

As shown in FIGS. 11 and 12, in a process that video frames of a plurality of input signal sources are received and written to the above DDR dynamic random access memory, the DI_RX1–SDI_RX 4 and the HDMI_RX1–HDMI_RX14, also known as the above receivers 124, receive SDI signals and HDMI signals respectively. Four of the input signal sources may be selected as received signal sources by controlling the video data selection unit 127, and the received signal sources are written into the memory. An initial write frame address of the WDMA, that is, of the write memory controller 125, is 3, and operations for updating the write 20) frame addresses are as follows. Update timings are rising edges of the vertical synchronization (Vsync) signals of the respective received signal sources. The updating of the write frame addresses of WDMA meets the following requirements:

Formula (1), WDMA_add (new)=WDMA_add (old)+1, wherein WDMA_add (new) is an updated write frame address, and WDMA_add (old) is a write frame address of a latest previous frame, i.e., the last one frame.

In a process that timings of the video frames of received signal sources are detected, logic diagrams of detection of the video frames of received signal sources are as shown in FIG. 12, and a specific execution process mainly includes the following three parts:

1. Detection of the Frame Rates of the Received Signal Sources

The timing sequence detector 123 adopts a local high-speed clock domain to detect the four signals output by the video data selection unit 127, and detects the frame period of each received signal source, i.e., a time interval between rising edges of adjacent vertical synchronization signals of each received signal source. The manner in which the timing sequence detector 123 detects the frame periods of the respective signals can be referred to the aforementioned embodiments.

A fastest received signal source, that is, the signal source having a minimum frame period, is denoted as F_fast, and the corresponding frame period is denoted as T_fast. The method for determining the signal source having the minimum frame period can be referred to the aforementioned embodiments.

Other received signal sources, i.e., remaining received signal sources other than the signal source having the minimum frame period are denoted as F_other_1/2/3; and the corresponding frame periods are denoted as T_other_1/2/3. A relationship of F_fast and T_other_1/2/3 meets the following formula:

Formula (2), T_fast<MIN (T_other_1, T_other_2, T_other_3), wherein MIN means taking the minimum one.

2. Calculation for a Delay Time

The delay time is a delayed trigger time for reading the memory, denoted as T_wait, which is to ensure that when a logic for reading the memory is triggered, each of the four signal sources has already saved a complete frame of image in the memory, and time differences, i.e., the frame period differences, of the rising edges of the vertical synchronization signals of F_other_1/2/3 relative to the rising edge of the vertical synchronization signal of F_fast are denoted as T1_dly/T2_dly/T3_dly. The method for determining T1_dly/T2_dly/T3_dly can be referred to the determination methods of the frame period differences of T12, T13, T14, and T15 in the aforementioned embodiments. T_wait meets:

Formula (3), T_wait=MAX (T1_dly+T_other_1, T2_dly+T_other_2, T3_dly+T_other_3), wherein MAX means taking the maximum one.

3. Trigger Logic

A read timing of a read side, i.e., an output side, of the memory is generated by the read control signal generating unit 121. The read control signal generating unit 121 receives a trigger signal of F_fast, which is the rising edge of the vertical synchronization signal of F_fast. That is, after the rising edge of the vertical synchronization signal of each frame of F_fast delays a time of T_wait, the read control signal generating unit 121 is triggered to generate the aforementioned read control signal, that is, the rising edge of the vertical synchronization signal of each frame of F_fast delayed by the time of T_wait is the aforementioned read control signal.

In a process that the video frames are read out from the memory, the read memory controller 122, namely RDMA 0/1/2/3, reads data from the memory through the timing signal, i.e., the aforementioned read control signal generated by the read control signal generating unit 121. In the embodiment of the disclosure, according to sizes of the frame period differences of received signal sources F_other_1/2/3 with respect to F_fast, reading logic of determining read frame address of the read memory controller 122, namely of RDMA 0/1/2/3, distinguishes different situations in the following update rules.

Specifically, an initial read frame address of the read memory controllers 122, namely RDMA 0/1/2/3, is supposed to be 0, that is, RDMA 0/1/2/3 add=0.

For example, if T_other_n-T_fast<T_fast*0.1, wherein n is a number indicating the received signal source, that is, under a condition that the rising edge of the read control signal arrives and a difference between the frame period of one of the remaining signal sources and the minimum frame period is less than a preset value, i.e., the difference of the frame rates between the two received signal sources is within a certain range, the difference of the frame rates can be absorbed through a blanking interval between two video frames. At this time, the signals F_other_n strictly follow the signal F_fast, and the signals F_other_n and the signal F_fast synchronously update the read frame address thereof, so that, by eliminating an error through the blanking interval between two video frames, error accumulation of the frame rates is voided. At this time, the read frame address and the write frame address of the signal source having the minimum frame period and the one of the remaining signal sources meet:

Formula (4), RDMA_fast_add=WDMA_fast_add−1, and
Formula (5), RDMA_other_add=RDMA_fast_add.

If T_other_n-T_fast>=T_fast*0.1, wherein n is the number indicating the received signal source, that is, under a condition that the rising edge of the read control signal arrives and the difference between the frame period of the one of the remaining signal sources and the minimum frame period is not less than the preset value, i.e., the difference of the frame rates between the two received signal sources is relatively significant, the read frame address of the RDMA for the one of the remaining signal sources keeps a latest complete frame thereof, that is, reading of the video frame of the one of the remaining signal sources is, repeatedly reading the video frame corresponding to the last write frame address corresponding to the one of the remaining signal sources. At this time, the read frame address and the write frame address of the signal source having the minimum frame period and the one of the remaining signal sources meet:

Formula (6), RDMA_fast_add=WDMA_fast_add−1, and
Formula (7), RDMA_other_add=WDMA_other_add−1.

Among them, RDMA_fast_add is the read frame address of the signal source having the minimum frame period, WDMA_fast_add is the write frame address of the signal source having the minimum frame period, RDMA_other_add is the read frame address of the one of the remaining signal sources, and WDMA_other_add is the write frame address of the one of the remaining signal sources.

Figure 13:
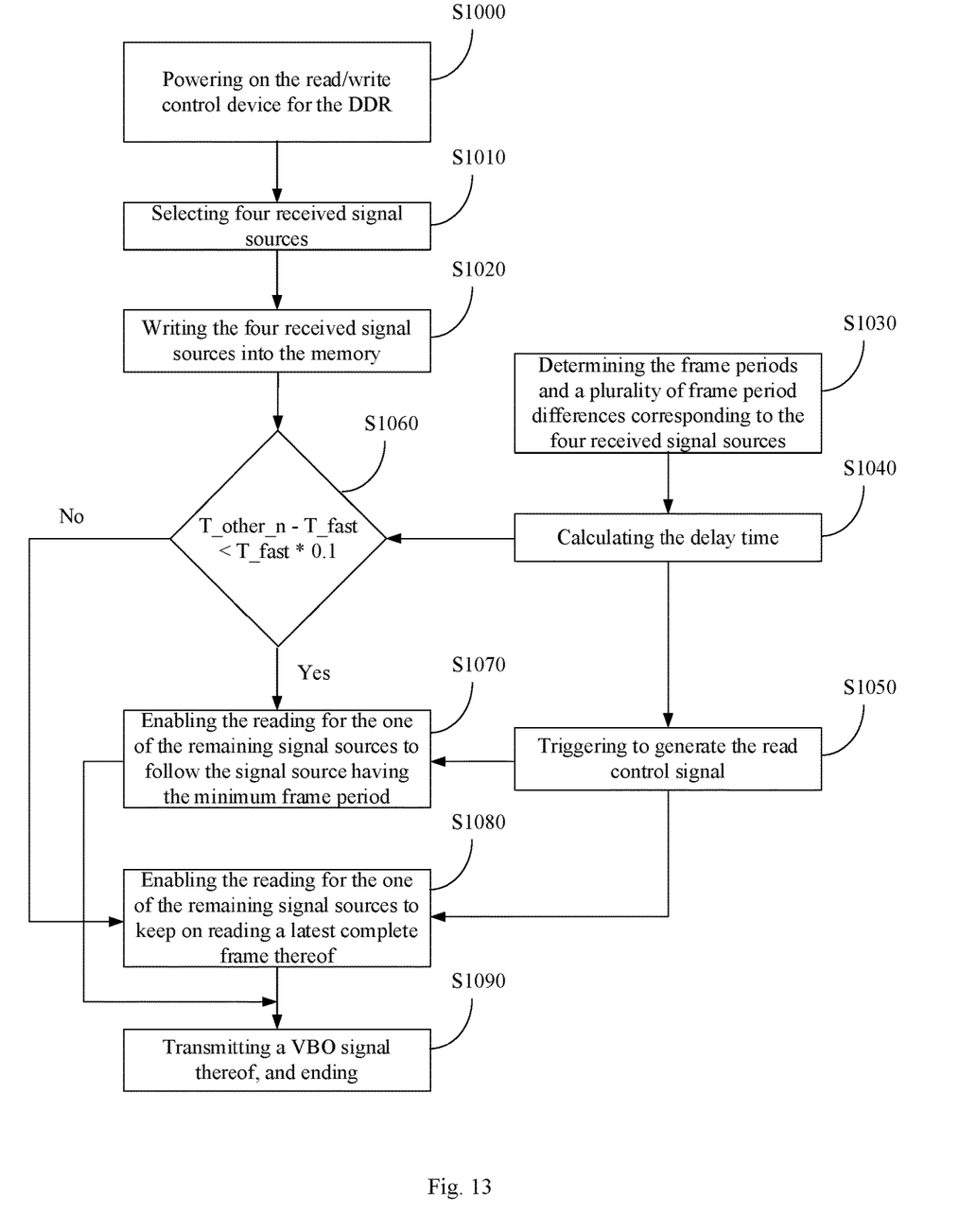
FIG. 13 shows a flowchart of further another read/write control method for a DDR dynamic random access memory provided by an embodiment of the disclosure.

FIG. 13 shows a flowchart of further another read/write control method for the DDR dynamic random access memory provided by an embodiment of the disclosure. As shown in FIG. 13, a main process of the method includes the following steps:

S1000, powering on the read/write control device for the DDR for initialization as a whole;

S1010, selecting four received signal sources, by the video data selection unit 127, wherein the initial write frame address of the WDMA for the four received signal sources is 3, and the initial read frame address of the RDMA for the four received signal sources is 0;

S1020, writing the four received signal sources into the memory based on the logic of receiving and writing video signals as mentioned above;

S1030, determining the frame periods respectively corresponding to the four received signal sources based on respective time intervals between respective two adjacent vertical synchronization signals of the four received signal sources; and determining vertical synchronization signals corresponding to each other of the four received signal sources, and determining a plurality of frame period differences based on the vertical synchronization signals corresponding to each other of the four received signal sources;

S1040, calculating the trigger time, by the read control signal generating unit 121;

S1050, triggering to generate the read control signal, by the read control signal generating unit 121;

S1060, determining the sizes of the frame period differences of the received signal sources F_other_1/2/3 with respect to F_fast, so as to distinguish different situations of the reading logic of determining the read frame address of the read memory controller 122, namely of the RDMA 0/1/2/3, in update rules;

S1070, enabling the reading of the RDMA for the one of the remaining signal sources to follow the signal source having the minimum frame period;

S1080, enabling the reading of the RDMA for the one of the remaining signal sources to keep on reading a latest complete frame thereof; and S1090, transmitting a VBO signal thereof, and ending.

The modules, functions or steps mentioned in FIGS. 10-14 similar to those in the embodiments of FIGS. 1-9 can be referred to the description of the embodiments of FIGS. 1-9.

The solutions of the embodiments of the disclosure focus on direct relations among the frame rates of the input signal sources, and further distinguishes two situations for processing, to avoid signal frame loss. At the same time, for signals with close frame rates, by eliminating errors among frames, error accumulation of the frame rate is voided.

The above only describes preferred embodiments of the disclosure and applied technical principles. It should be understood by those skilled in the art that the scope of disclosure involved in the disclosure is not limited to technical solutions formed by the specific combination of the above-mentioned technical features, but also covers other technical solutions formed by any combination of the above-mentioned technical features or their equivalent features without departing from the aforementioned disclosed concepts, for example, technical solutions formed by replacing the above features with technical features with similar functions disclosed in the disclosure (but not limited thereto).

The invention claimed is:

1. A read/write control device for a DDR dynamic random access memory, wherein the DDR dynamic random access memory is used for saving video frames of a plurality of received signal sources, the device comprises: a timing sequence detector, a read control signal generating unit and a read memory controller, the timing sequence detector is in signal connection with the read control signal generating unit, and the read control signal generating unit is in signal connection with the read memory controller;

the timing sequence detector is configured for: determining a plurality of frame periods respectively corresponding to the plurality of received signal sources based on respective time intervals between respective two adjacent vertical synchronization signals of the plurality of received signal sources; and determining vertical synchronization signals corresponding to each other of the plurality of received signal sources, and determining a plurality of frame period differences based on the vertical synchronization signals corresponding to each other of the plurality of received signal sources;

the read control signal generating unit is configured for: reading the plurality of frame periods and the plurality of frame period differences determined by the timing sequence detector; determining a minimum frame period from the plurality of frame periods; from the plurality of frame period differences, determining frame period differences of remaining signal sources with respect to a signal source having the minimum frame period; respectively summing the frame period differences of the respective remaining signal sources with the corresponding frame periods, to obtain a maximum value as a delay time; and delaying respective rising edges of the signal source having the minimum frame period, by the delay time, to generate a read control signal, and providing the read control signal to the read memory controller; and the read memory controller is configured for: controlling reading of the video frames from the DDR dynamic random access memory according to the read control signal.

2. The device according to claim 1, wherein the read control signal generating unit is further configured for:

delaying the respective rising edges of the signal source having the minimum frame period, by the delay time, to obtain a rising edge of the read control signal.

3. The device according to claim 2, wherein the read memory controller is further configured for:

updating a read frame address to obtain an updated read frame address, under a condition that the rising edge of the read control signal arrives; and according to the updated read frame address, reading the video frames from the DDR dynamic random access memory.

4. The device according to claim 3, wherein the read memory controller is further configured for:

under a condition that the rising edge of the read control signal arrives and a difference between the frame period of one of the remaining signal sources and the minimum frame period is less than a preset value, the one of the remaining signal sources follows the signal source having the minimum frame period to synchronously update the read frame address; and under a condition that the rising edge of the read control signal arrives and the difference between the frame period of the one of the remaining signal sources and the minimum frame period is not less than the preset value, the reading of the video frame of the one of the remaining signal sources is, repeatedly reading the video frame corresponding to a last write frame address corresponding to the one of the remaining signal sources.

5. The device according to claim 4, wherein the preset value is: T_fast*0.1, wherein T_fast is the minimum frame period.

6. The device according to claim 4, wherein the read frame address and write frame address of the signal source having the minimum frame period and the one of the remaining signal sources meet:

under the condition that the rising edge of the read control signal arrives and the difference between the frame period of the one of the remaining signal sources and the minimum frame period is less than the preset value, RDMA_fast_add=WDMA_fast_add−1, and RDMA_other_add=RDMA_fast_add; and under the condition that the rising edge of the read control signal arrives and the difference between the frame period of the one of the remaining signal sources and the minimum frame period is not less than the preset value, RDMA_fast_add=WDMA_fast_add−1, and RDMA_other_add=WDMA_other_add−1, wherein RDMA_fast_add is the read frame address of the signal source having the minimum frame period, WDMA_fast_add is the write frame address of the signal source having the minimum frame period, RDMA_other_add is the read frame address of the one of the remaining signal sources, and WDMA_other_add is the write frame address of the one of the remaining signal sources.

7. The device according to claim 1, further comprising: a video data selection unit being in signal connection between write memory controllers and the DDR dynamic random access memory, and configured for selecting the plurality of received signal sources from input signal sources.

8. The device according to claim 1, further comprising: an AXI bus controller configured for performing interrupt processing on an equipment interrupt request.

9. A read/write control method for a DDR dynamic random access memory, wherein the method is applied to the read/write control device for the DDR dynamic random access memory according to claim 1, and the method comprises:

determining the plurality of frame periods respectively corresponding to the plurality of received signal sources based on the respective time intervals between respective two adjacent vertical synchronization signals of the plurality of received signal sources; and determining the vertical synchronization signals corresponding to each other of the plurality of received signal sources, and determining the plurality of frame period differences based on the vertical synchronization signals corresponding to each other of the plurality of received signal sources;

determining the minimum frame period from the plurality of frame periods; from the plurality of frame period differences, determining the frame period differences of the remaining signal sources with respect to the signal source having the minimum frame period; respectively summing the frame period differences of the respective remaining signal sources with the corresponding frame periods, to obtain the maximum value as the delay time; and delaying the respective rising edges of the signal source having the minimum frame period, by the delay time, to generate the read control signal; and controlling the reading of the video frames from the DDR dynamic random access memory according to the read control signal.

10. The method according to claim 9, wherein the step of generating the read control signal further comprises:

delaying the respective rising edges of the signal source having the minimum frame period, by the delay time, to obtain a rising edge of the read control signal.

11. The method according to claim 10, further comprising:

updating a read frame address to obtain an updated read frame address under a condition that the rising edge of the read control signal arrives; and according to the updated read frame address, reading the video frames from the DDR dynamic random access memory.

12. The method according to claim 11, further comprising:

under a condition that the rising edge of the read control signal arrives and a difference between the frame period of one of the remaining signal sources and the minimum frame period is less than a preset value, the one of the remaining signal sources follows the signal source having the minimum frame period to synchronously update the read frame address; and under a condition that the rising edge of the read control signal arrives and the difference between the frame period of the one of the remaining signal sources and the minimum frame period is not less than the preset value, the reading of the video frame of the one of the remaining signal sources is, repeatedly reading the video frame corresponding to a last write frame address corresponding to the one of the remaining signal sources.

13. The method according to claim 12, wherein the preset value is: T_fast*0.1, wherein T_fast is the minimum frame period.

14. The method according to claim 12, wherein the read frame address and write frame address of the signal source having the minimum frame period and the one of the remaining signal sources meet:

under the condition that the rising edge of the read control signal arrives and the difference between the frame period of the one of the remaining signal sources and the minimum frame period is less than the preset value, RDMA_fast_add=WDMA_fast_add−1, and RDMA_other_add=RDMA_fast_add; and under the condition that the rising edge of the read control signal arrives and the difference between the frame period of the one of the remaining signal sources and the minimum frame period is not less than the preset value, RDMA_fast_add=WDMA_fast_add−1, and RDMA_other_add=WDMA_other_add−1, wherein RDMA_fast_add is the read frame address of the signal source having the minimum frame period, WDMA_fast_add is the write frame address of the signal source having the minimum frame period, RDMA_other_add is the read frame address of the one of the remaining signal sources, and WDMA_other_add is the write frame address of the one of the remaining signal sources.

15. The method according to claim 9, further comprising: selecting the plurality of received signal sources from input signal sources.

16. The method according to claim 9, further comprising: powering on the read/write control device for the DDR dynamic random access memory for initialization as a whole, wherein write frame address of the device is initialized to 3, and when the read memory controller is powered on, read frame address of the read memory controller is initialized to 0.

17. A monitor system, wherein the system comprises the read/write control device for the DDR dynamic random access memory according to claim 1.

18. The system according to claim 17, wherein the read/write control device for the DDR dynamic random access memory further comprises write memory controllers, and the write memory controllers are configured for controlling writing of the video frames of the plurality of received signal sources into the DDR dynamic random access memory.

19. The system according to claim 18, wherein the read/write control device for the DDR dynamic random access memory further comprises an image superimposing unit, and the image superimposing unit is configured for superimposing the video frames read from the DDR dynamic random access memory and outputting the superimposed video frames.

20. The system according to claim 18, wherein the read/write control device for the DDR dynamic random access memory further comprises a plurality of receivers corresponding to digital component serial interfaces and/or a plurality of receivers corresponding to high definition multimedia interfaces, the plurality of receivers corresponding to the digital component serial interfaces and/or the plurality of receivers corresponding to the high definition multimedia interfaces are in signal connection with a video data selection unit via the write memory controllers, and input ends of the video data selection unit are in one-to-one correspondence to the write memory controllers; and the plurality of receivers corresponding to the digital component serial interfaces and/or the plurality of receivers corresponding to the high definition multimedia interfaces are configured for receiving monitor video data from the corresponding digital component serial interfaces and/or the corresponding high definition multimedia interfaces, and providing the monitor video data to the write memory controllers.

* * * * *